United States Patent [19]
Ito

[11] Patent Number: 5,710,800
[45] Date of Patent: Jan. 20, 1998

[54] DATA RECEIVING DEVICE

[75] Inventor: Masahiro Ito, Hamamatsu, Japan

[73] Assignee: Yamaha Corporation, Hamamatsu, Japan

[21] Appl. No.: 558,325

[22] Filed: Nov. 15, 1995

[30] Foreign Application Priority Data

Nov. 16, 1994 [JP] Japan .................................. 6-281737

[51] Int. Cl.$^6$ .................................................. G06F 13/00
[52] U.S. Cl. ..................... 375/370; 375/369; 395/421.09; 395/843; 395/845; 395/872; 395/873; 395/877; 395/878; 395/881; 364/DIG. 1
[58] Field of Search ..................... 375/369, 370; 395/421.09, 843, 845, 872, 873, 877, 878, 881

[56] References Cited

U.S. PATENT DOCUMENTS

| | | | |
|---|---|---|---|
| 4,914,618 | 4/1990 | Dodge | 375/370 |
| 5,199,051 | 3/1993 | Nakabayashi et al. | 375/369 |
| 5,548,787 | 8/1996 | Okamura | 395/845 |
| 5,619,733 | 4/1997 | Noe et al. | 395/881 |
| 5,623,522 | 4/1997 | Ito | 375/369 |

*Primary Examiner*—Frank J. Asta
*Attorney, Agent, or Firm*—Loeb & Loeb LLP

[57] ABSTRACT

A data receiving device, applicable to a system which receives data sequentially transmitted thereto in a non-periodical manner under control of a host CPU, is configured by a receiving circuit, a counter circuit, a memory circuit and register circuits. A plurality of input data are sequentially supplied to the receiving circuit, so that the receiving circuit produces a strobe signal when receiving each input data. The counter circuit measures a receiving interval of time between moments of receiving two input data which are consecutively received by the receiving circuit. The memory circuit has specific storage capacity for storing predetermined sets of main data and time data, wherein the main data are extracted from the receiving circuit and the time data correspond to the receiving interval of time. Herein, the main data are stored with being related to the time data. If the storage capacity of the memory circuit is fully occupied by the predetermined sets of main data and time data, the memory circuit is put in a read state, so that the main data and time data are transferred to the register circuits in turn. The host CPU controls output timings by which the main data and time data are respectively outputted from the register circuits, so that the system can receive the main data together with the time data in a desired manner.

8 Claims, 7 Drawing Sheets

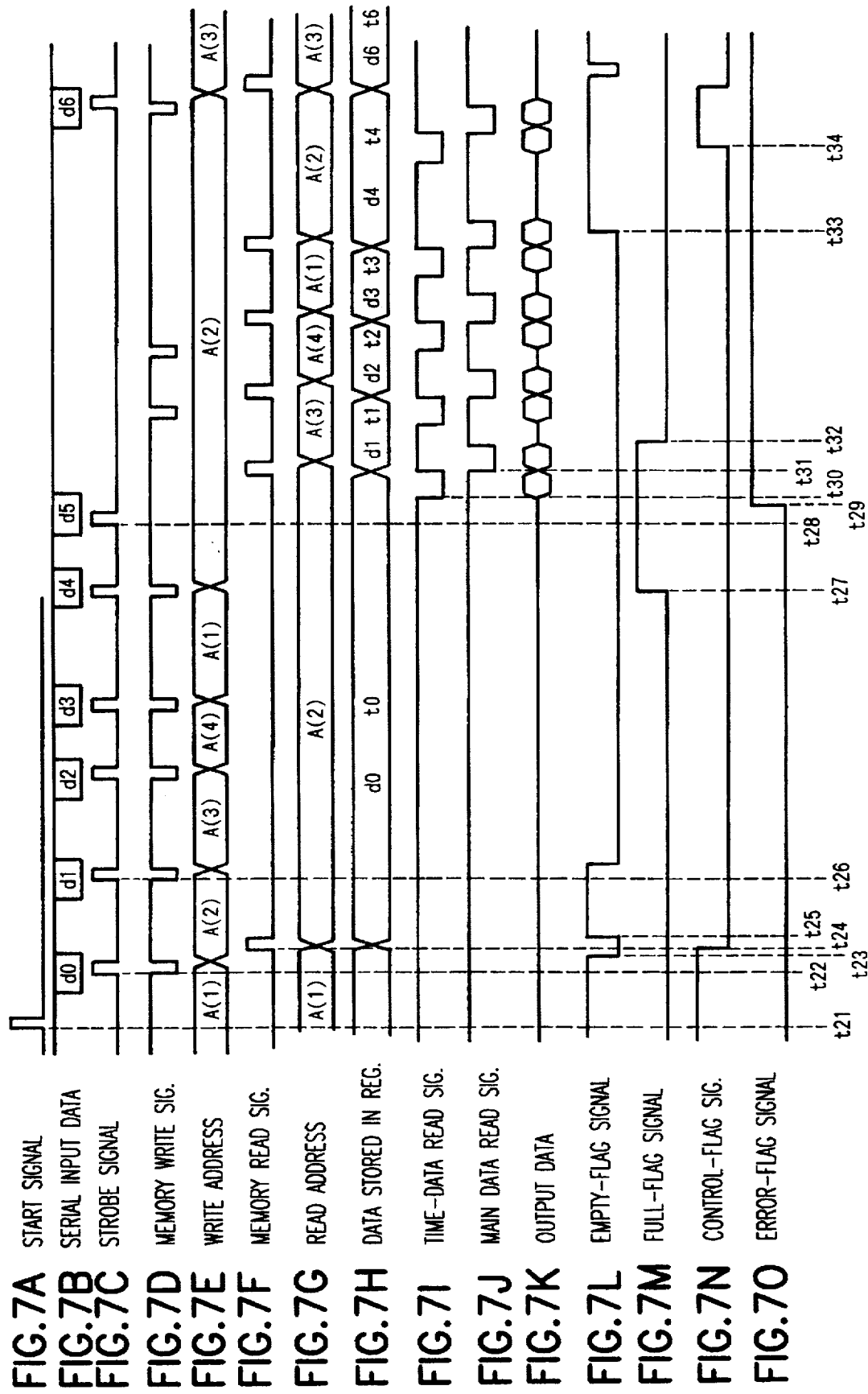

DATA RECEIVING DEVICE

BACKGROUND OF THE INVENTION

1. Field of the Invention

The invention relates to data receiving devices, and more particularly to a data receiving device which is capable of handling data transmitted thereto in a non-periodical manner.

2. Prior Art

The invention is concerned with the data receiving device which receives data transmitted thereto non-periodically and which is suitable for use in a system which manages receiving data together with time data representative of intervals of time between receiving moments of the data.

In a system to which data are periodically transmitted, it is not necessary to manage intervals of time between receiving moments of the data (hereinafter, referred to as receiving intervals of time) by the data receiving device. In another system to which data are transmitted non-periodically, it may be sometimes required to manage the receiving intervals of time by the data receiving device. For example, a system, which receives MIDI data (where MIDI is an abbreviation for 'Musical Instrument Digital Interface') so as to record them as performance data, should require event data as well as time data. Herein, the event data correspond to key data representing keys which are operated in a keyboard; and the time data (or duration data) represent intervals of time between the event data. That is, in order to record the performance data, it is necessary to record (or manage) the receiving intervals of time as well.

In the conventional system which requires management for the receiving intervals of time, a host CPU, provided for the system, drives a general-purpose timer by software such that when data are received by a data receiving device, receiving intervals of time are read by the general-purpose timer.

However, in order to do so, the host CPU should normally monitor whether data are received by the data receiving device. This is troublesome. Further, when the data receiving device receives the data, the system should perform processing of transferring the receiving data, which have a priority in processing, as well as another processing of reading the receiving intervals of time by the general-purpose timer. So, the conventional system suffers from a problem due to a fact that an amount of load imparted to the host CPU is increased. This causes a trouble for execution in time-division-multiplex processing by the host CPU.

SUMMARY OF THE INVENTION

It is an object of the invention to provide a data receiving device which is capable of managing receiving intervals of time without increasing an amount of load imparted to a host CPU provided in a system to which data are transmitted in a non-periodical manner.

More precisely, the invention provides a data receiving device which provides a storage section for storing the receiving intervals of time in connection with receiving data.

The invention provides a data receiving device applicable to a system which receives data sequentially transmitted thereto in a non-periodical manner under control of a host CPU. The data receiving device is configured by a receiving circuit, a counter circuit, a memory circuit and register circuits. A plurality of input data are sequentially supplied to the receiving circuit, so that the receiving circuit produces a strobe signal when receiving each input data. The counter circuit measures a receiving interval of time between moments of receiving two input data which are consecutively received by the receiving circuit. The memory circuit has specific storage capacity for storing predetermined sets of main data and time data, wherein the main data are extracted from the receiving circuit and the time data correspond to the receiving interval of time. Herein, the main data are stored with being related to the time data. If the storage capacity of the memory circuit is fully occupied by the predetermined sets of main data and time data, the memory circuit is put in a read state, so that the main data and time data are transferred to the register circuits in turn. The host CPU controls output timings by which the main data and time data are respectively outputted from the register circuits, so that the system can receive the main data together with the time data in a desired manner.

Further, if the data receiving device detects a receiving error in which the receiving circuit further receives input data after a fully-stored state of the memory circuit is established, an error-flag signal is produced, so that the host CPU can acknowledge occurrence of the receiving error.

BRIEF DESCRIPTION OF THE DRAWINGS

These and other objects of the subject invention will become more fully apparent as the following description is read in light of the attached drawings wherein:

FIGS. 7A to 7O are time charts showing data and signals representing operations of the data receiving device of FIG. 5.

DESCRIPTION OF THE PREFERRED EMBODIMENTS

[A] First Embodiment

Figure 1:
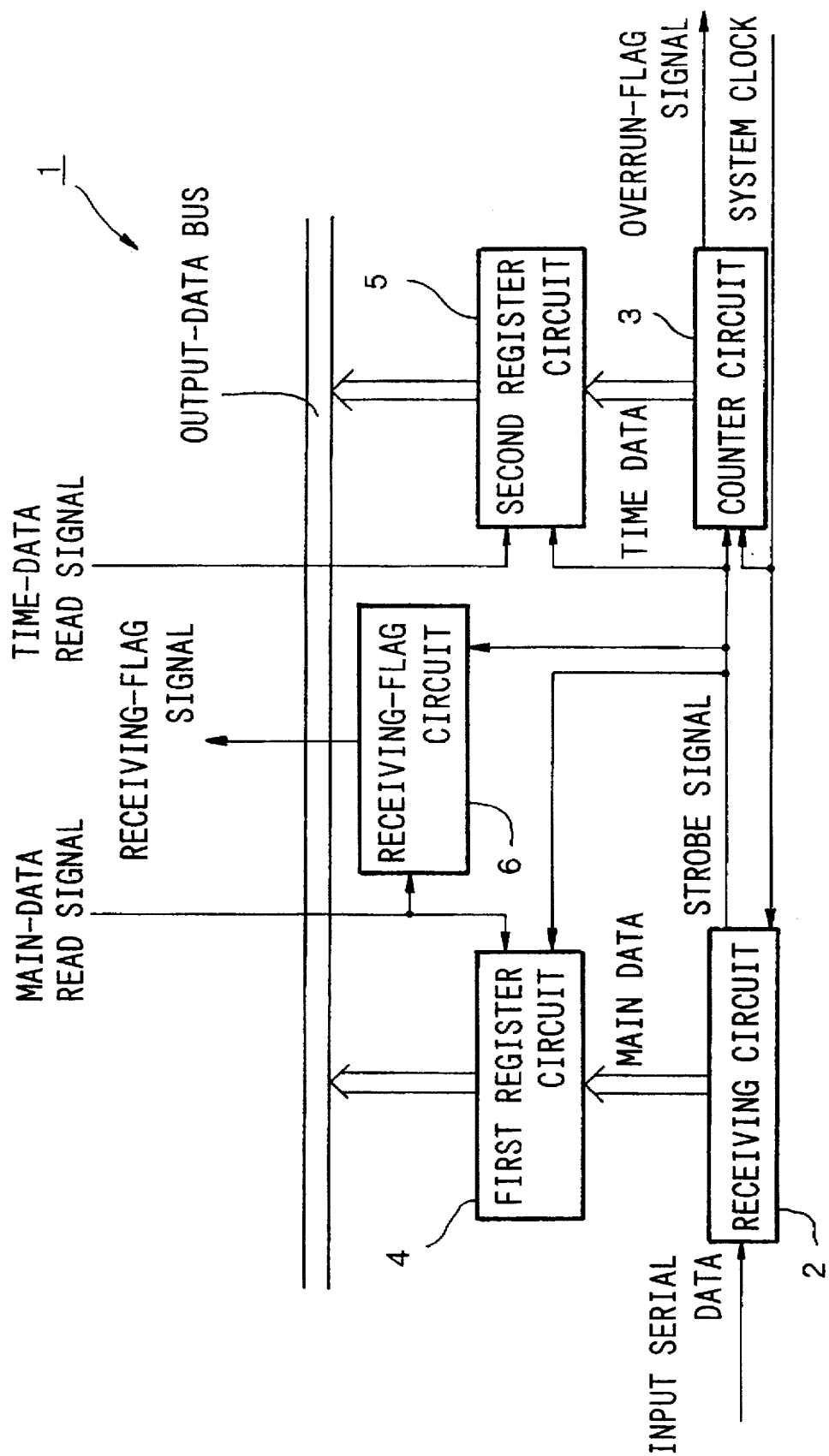
FIG. 1 is a block diagram showing a configuration of a data receiving device in accordance with a first embodiment of the invention.

FIG. 1 is a block diagram showing a configuration of a data receiving device which is designed in accordance with a first embodiment of the invention. In FIG. 1, a data receiving device 1 is configured by a receiving circuit 2, a counter circuit 3, a first register circuit 4, a second register circuit 5 and a receiving-flag circuit 6. Herein, the receiving circuit 2 receives data transmitted thereto; the counter circuit 3 counts number of system clocks which are outputted from a clock circuit (not shown); the first register circuit 4 extracts receiving data (i.e., main data) from the data received by the receiving circuit 2 so as to store them therein; the second register circuit 5 extracts count number of the counter circuit 3 so as to store it therein as time data; and the receiving-flag circuit 6 produces a receiving-flag signal representative of receipt of the data by the receiving circuit 2. In the first embodiment, the aforementioned storage section of the invention is configured by the register circuits 4 and 5. In addition, the count number (i.e., time data) of the counter circuit 3 represents the aforementioned receiving interval of time which is managed by the invention. The data receiving device of this embodiment is designed for use in a system such as a serial-MIDI-data-receiving/recording apparatus, for example. The system provides a host CPU which provides read signals to read out data from the register circuits 4 and 5 respectively.

The data receiving device 1 receives data which are transmitted thereto non-periodically. The receiving circuit 2 is designed as a circuit for receiving asynchronous serial data which are transmitted in a start-stop-synchronization method (or asynchronous method), for example. The receiving circuit 2 receives the serial data as parallel data in unit of word. When receiving the data, the receiving circuit 2 outputs a strobe signal representative of completion in receipt of the data. This strobe signal is delivered to the counter circuit 3, the first register circuit 4, the second register circuit 5 and the receiving-flag circuit 6. Upon receipt of the strobe signal, the first register circuit 4 extracts the parallel data from the receiving circuit 2; and the parallel data extracted are stored therein as main data. Similarly, the second register circuit 5 extracts count number from the counter circuit 3; and the count number extracted is stored therein as time data. Then, the counter circuit 3 resets the count number thereof. Incidentally, the count number, which is extracted by and is stored in the second register circuit 5, is obtained from the counter circuit 3 before being reset. Upon receipt of the strobe signal, the receiving-flag circuit 6 turns a receiving-flag signal to 'ON'. The receiving-flag signal is transmitted to a host CPU (not shown) which is provided for the system.

When the receiving-flag signal is turned 'ON', the host CPU produces a main-data read signal and a time-data read signal. The main-data read signal is supplied to the first register circuit 4, while the time-data read signal is supplied to the second register circuit 5.

Upon receipt of the main-data read signal, the first register circuit 4 outputs the main data onto an output-data bus. Upon receipt of the time-data read signal, the second register circuit 5 outputs the time data onto the output-data bus. When the main data and time data are outputted on the output-data bus, the receiving-flag circuit 6 turns the receiving-flag signal to 'OFF'. By the way, when the count number exceeds (or overruns) maximum count number, which is maximum number counted by the counter circuit 3, so that the count number is reset to zero, the counter circuit 3 produces an overrun-flag signal. The overrun-flag signal is a pulse signal which occurs every time an overrun event occurs in the counter circuit 3. Every time the overrun-flag signal is produced, the host CPU performs an interrupt process so as to detect number of times the overrun event occurs in the counter circuit 3.

Figure 2:
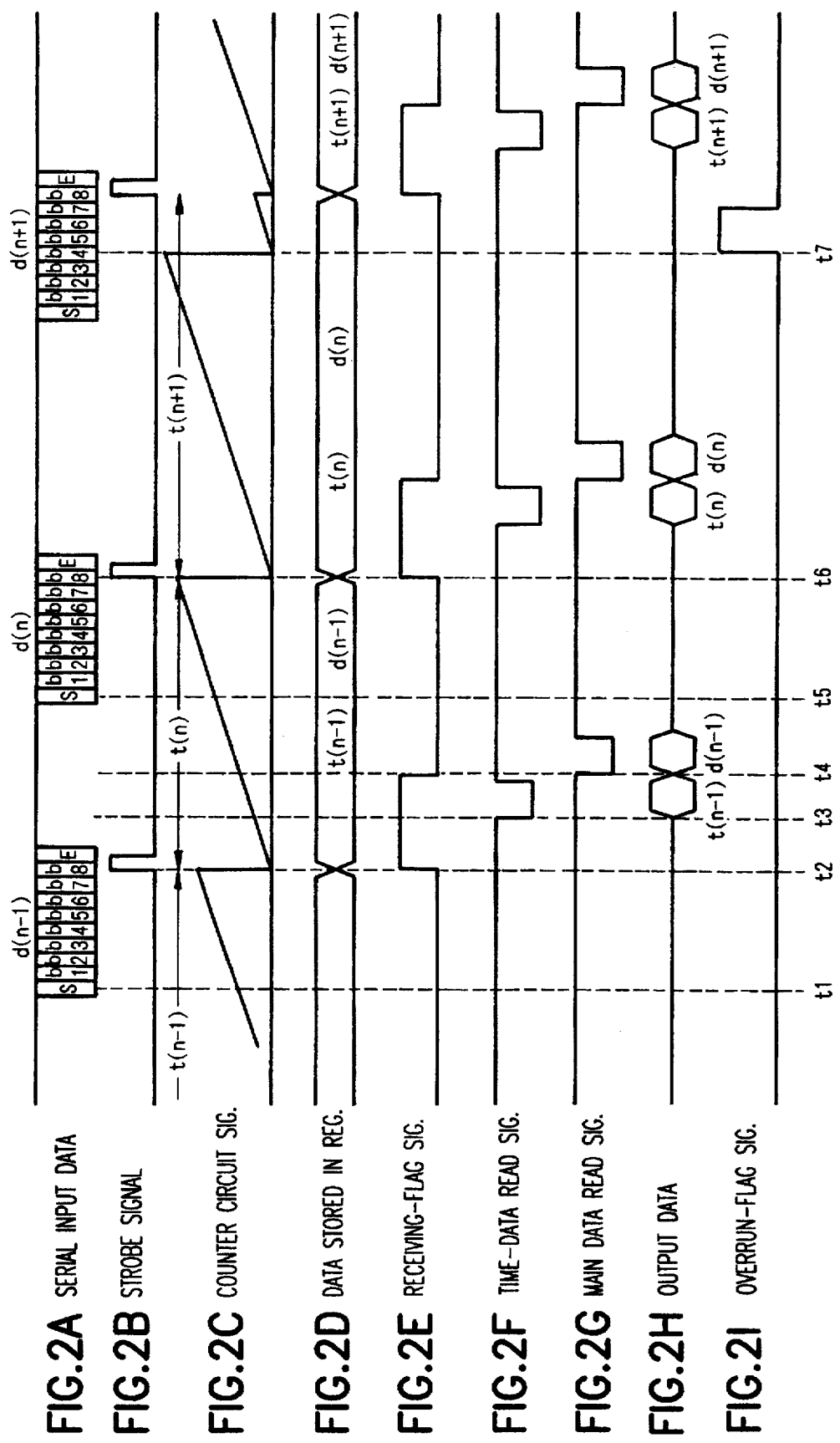
FIGS. 2A to 2I are time charts showing data and signals representing operations of the data receiving device of FIG. 1.

Next, operations of the data receiving device of the first embodiment will be described in detail. FIGS. 2A to 2I are time charts regarding the operations of the data receiving device. Herein, FIG. 2A shows input serial data which are transmitted to the receiving circuit 2 in an asynchronous manner. FIG. 2B shows the strobe signal which is outputted from the receiving circuit 2. FIG. 2C shows operations of the counter circuit 3. FIG. 2D shows data which are stored in the register circuits 4 and 5. FIG. 2E shows the receiving-flag signal which is outputted from the receiving-flag circuit 6. FIG. 2F shows the time-data read signal which is outputted from the host CPU. FIG. 2G shows the main-data read signal which is outputted from the host CPU. FIG. 2H shows data which are outputted on the output-data bus. FIG. 2I shows the overrun flag signal which is outputted from the counter circuit 3.

The input serial data, which are received by the receiving circuit 2, consist of 10 bits in which main data of 8 bits are sandwiched between a start bit 'S' and a stop bit 'E'. Herein, 8 bits of the main data are represented by numerals b1 to b8. As shown by FIG. 2A, a plurality of input serial data arrive at the receiving circuit 2 sequentially in an order of d(n−1), d(n) and d(n+1). At a moment t1 when the receiving circuit 2 detects a start bit S of the input serial data d(n−1), the receiving circuit 2 performs synchronization correction to sequentially input bits b1–b8 of the main data into a shift register or the like. At a moment t2 when preparation for parallel extraction is completed with respect to all of the bits b1–b8 of the main data, the receiving circuit 2 produces a first pulse of a strobe signal.

The strobe signal, which is outputted from the receiving circuit 2, is delivered to the register circuits 4 and 5. Upon receipt of the strobe signal, the first register circuit 4 extracts the input serial data, received by the receiving circuit 2, as parallel data; and the parallel data extracted are stored therein as main data. In addition, the second register circuit 5 extracts count number from the counter circuit 3; and the counter number extracted is stored therein as time data t(n−1).

When receiving the strobe signal, the counter circuit 3 resets the counter number to zero. Incidentally, the second register circuit 5 extracts and stores the count number of the counter circuit 3 before being reset. Further, when receiving the strobe signal, the receiving-flag circuit 6 turns a receiving-flag signal to 'ON'.

By detecting an ON event of the receiving-flag signal, the system can recognize a fact that the input serial data are received by the receiving circuit 2 while the main data and time data are respectively stored in the register circuits 4 and 5. When the main data and time data are respectively stored in the register circuits 4 and 5, the host CPU, specifically provided for the system, sends out the main-data read signal and time-data read signal to the data receiving device 1. Incidentally, the present embodiment is designed in such a way that the main-data read signal is outputted after the time-data read signal is outputted.

At a moment t3 when the host CPU outputs a time-data read signal, in other words, at a leading-edge timing of a reversed pulse of the time-data read signal, the second register circuit 5 is instructed to output the time data onto the output-data bus. Thereafter, at a moment t4 when the host CPU outputs a main-data read signal, in other words, at a leading-edge timing of a reversed pulse of the main-data read signal, the first register circuit 4 is instructed to output the main data onto the output-data bus. As described before, the main-data read signal is supplied to the receiving-flag circuit 6 as well. Upon receipt of the main-data read signal, the receiving-flag circuit 6 turns a receiving-flag signal to 'OFF'.

Thereafter, at a moment t5 when the receiving circuit 2 detects a start bit S of input serial data d(n), the receiving circuit 2 performs synchronization correction to sequentially input bits b1–b8 of main data into a shift register or the like. At a moment t6 when preparation for parallel extraction is completed with respect to all of the bits b1–b8 of the main data, the receiving circuit 2 produces a second pulse of the strobe signal. Thereafter, the aforementioned operations regarding the input serial data d(n−1) are performed with respect to the input serial data d(n) as well. Thus, the first register circuit 4 stores main data of the input serial data d(n); and the second register circuit 5 stores time data t(n). Then, the host CPU produces reversed pulses of the main-data read signal and time-data read signal, so the main data and time data are outputted onto the output-data bus.

In short, after the main data and time data are newly stored in the register circuits 4 and 5, the receiving-flag signal is turned 'ON'. Then, after the data are outputted onto the output-data bus, the receiving-flag signal is turned 'OFF'. Therefore, the host CPU is designed such that after the receiving-flag signal is turned 'ON', the main-data read signal and time-data read signal are outputted so as to obtain the main data and time data which correspond to receiving data of the receiving circuit 2. In addition, the present embodiment is designed such that the main-data read signal is outputted after outputting of the time-data read signal. Therefore, the receiving-flag signal can be turned 'OFF' only by the main-data read signal which is supplied to the data receiving device 1 after supplying of the time-data read signal.

Incidentally, the present embodiment is designed in such a way that the time-data read signal is inputted to the data receiving device 1 prior to the main-data read signal. However, an order of inputting those signals can be reversed. If such a reversed order is employed, the receiving-flag signal is turned 'OFF' by the time-data read signal.

At a moment t7 when count number of the counter circuit 3 overruns the maximum count number so that the count number is reset to zero, the counter circuit 3 produces an overrun-flag signal. This overrun-flag signal is transmitted to the host CPU. When receiving the overrun-flag signal, the host CPU performs an interrupt process to detect number of times by which an overrun event occurs in the counter circuit 3. Therefore, even if an overrun event occurs in the counter circuit 3, a data-receiving interval of time can be accurately calculated by an equation as follows:

$$I_R = (m \times T) + A \times S$$

where '$I_R$' represents the data-receiving interval of time; 'T' represents time which is required for one cycle in counting operation of the counter circuit 3; 'm' represents number of times by which an overrun event occurs; 'A' represents count number of the counter circuit 3; and 'S' represents time which is required for increasing the count number by one.

As described above, it is possible to store the receiving data and the time data (i.e., data-receiving interval of time) by the register circuits 4 and 5 in the data receiving device 1. Therefore, when the data receiving device 1 is used for the system which requires management of the data-receiving interval of time, it is possible to cancel detection of the data-receiving interval of time which is conventionally detected by the host CPU which drives the general-purpose timer. In short, an amount of load imparted to the host CPU can be reduced. Moreover, even if an overrun event occurs in the counter circuit 3, the host CPU is informed of occurrence of the overrun event by receiving an overrun-flag signal; therefore, it is possible to detect the data-receiving interval of time with accuracy. Further, the host CPU can acknowledge whether the receiving circuit 2 receives data on the basis of states of the receiving-flag signal. Thus, the host CPU is not required to monitor whether the receiving circuit 2 receives the data. This results in further reduction of the amount of load of the host CPU. As a result, the system as a whole can work efficiently.

[B] Second Embodiment

Figure 3:
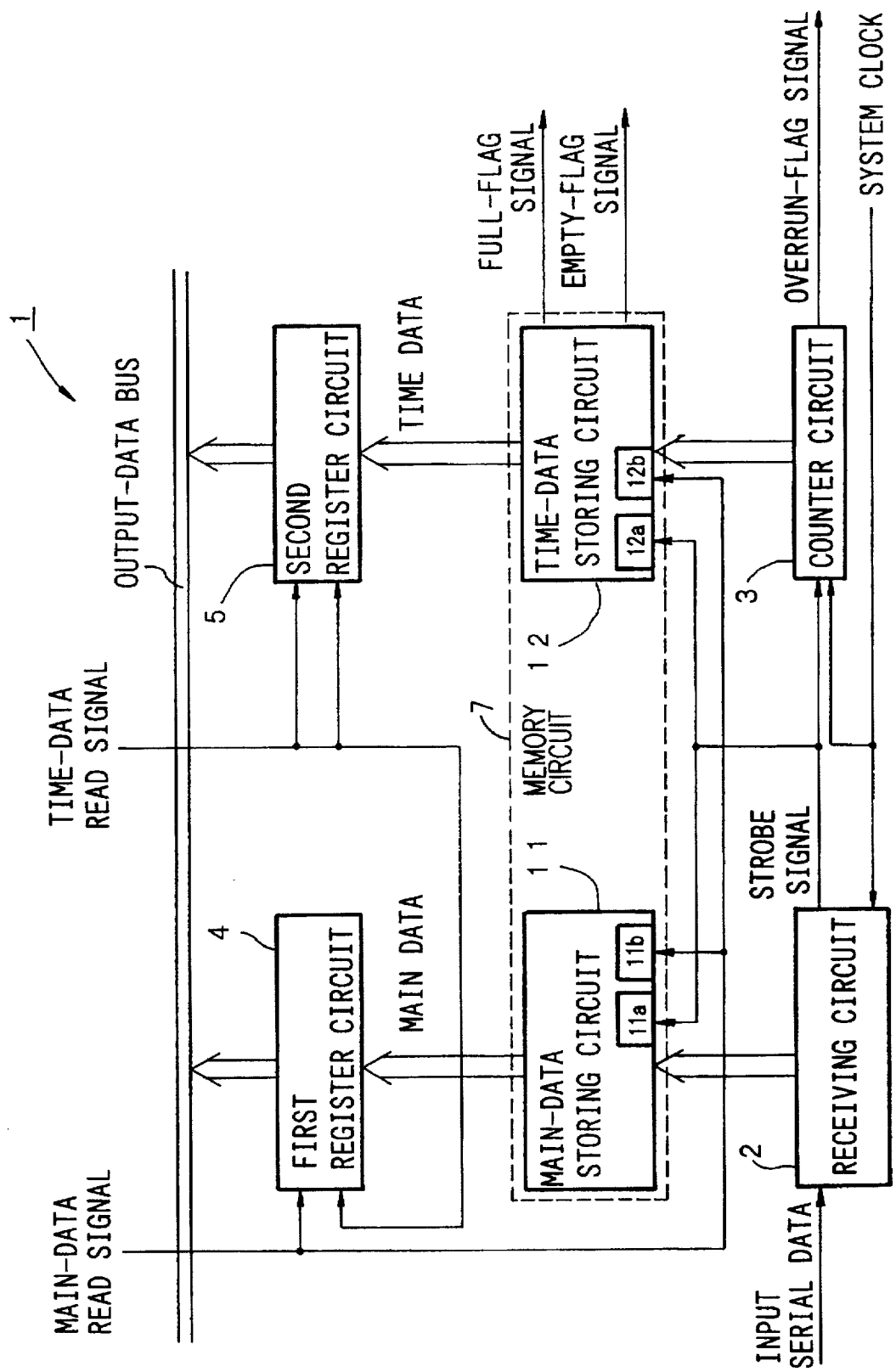
FIG. 3 is a block diagram showing a configuration of a data receiving device in accordance with a second embodiment of the invention.

FIG. 3 shows a configuration of a data receiving device which is designed in accordance with a second embodiment of the invention, wherein parts equivalent to those of FIG. 1 are designated by the same numerals; hence, the detailed description thereof will be omitted. Different from the data receiving device of FIG. 1, the data receiving device of FIG. 3 is designed such that the receiving-flag circuit 6 is removed while a memory circuit 7 is newly provided. The memory circuit 7 is designed to store main data and time data in such a way that the main data are related to the time data. Specifically, the memory circuit 7 contains a main-data storing circuit 11 and a time-data storing circuit 12. The main-data storing circuit 11 has a write-address creating circuit 11a and a read-address creating circuit 11b; and the time-data storing circuit 12 has a write-address creating circuit 12a and a read-address creating circuit 12b. Herein, the write-address creating circuit controls a write address by which data are written, while the read-address creating circuit controls a read address by which data are read out. Further, the memory circuit 7 produces a full-flag signal and an empty-flag signal. Herein, the full-flag signal represents a fully-stored state in which all addresses of the memory circuit 7 are occupied by non-read data (i.e., data which are not read out and are not outputted onto the output-data bus). The empty-flag signal represents an empty state in which all addresses of the memory circuit 7 are empty and are not occupied by the non-read data.

In the second embodiment, the aforementioned strobe signal outputted from the receiving circuit 2 is supplied to the memory circuit 7. In the memory circuit 7, main data are stored in the main-data storing circuit 11 at addresses which are set by the write-address creating circuit 11a, while time data are stored in the time-data storing circuit 12 at addresses which are set by the write-address creating circuit 12a. After completion of storing the data, the addresses, which are respectively set by the write-address creating circuits 11a and 12a, are increased by one; in other words, those addresses are subjected to increment operation.

If the host CPU of the second embodiment is designed similar to that of the first embodiment so that the time-data read signal is followed by the main-data read signal, the second embodiment works as follows:

Upon receipt of the time-data read signal, the first register circuit 4 accesses the main-data storing circuit 11 to extract main data which are stored at addresses set by the read-address creating circuit 11b, so the main data extracted are stored therein. Similarly, the second register circuit 5 accesses the time-data storing circuit 12 to extract time data which are stored at addresses set by the read-address creating circuit 12b, so the time data extracted are stored therein. The time data, stored in the second register circuit 5, are outputted onto the output-data bus. Then, after the main-data read signal is inputted to the data receiving circuit, the main data, which are stored in the first register circuit 4, are outputted onto the output-data bus. Moreover, the main-data read signal is supplied to the read-address creating circuits 11b and 12b, so their addresses are subjected to increment operations.

Figure 4:
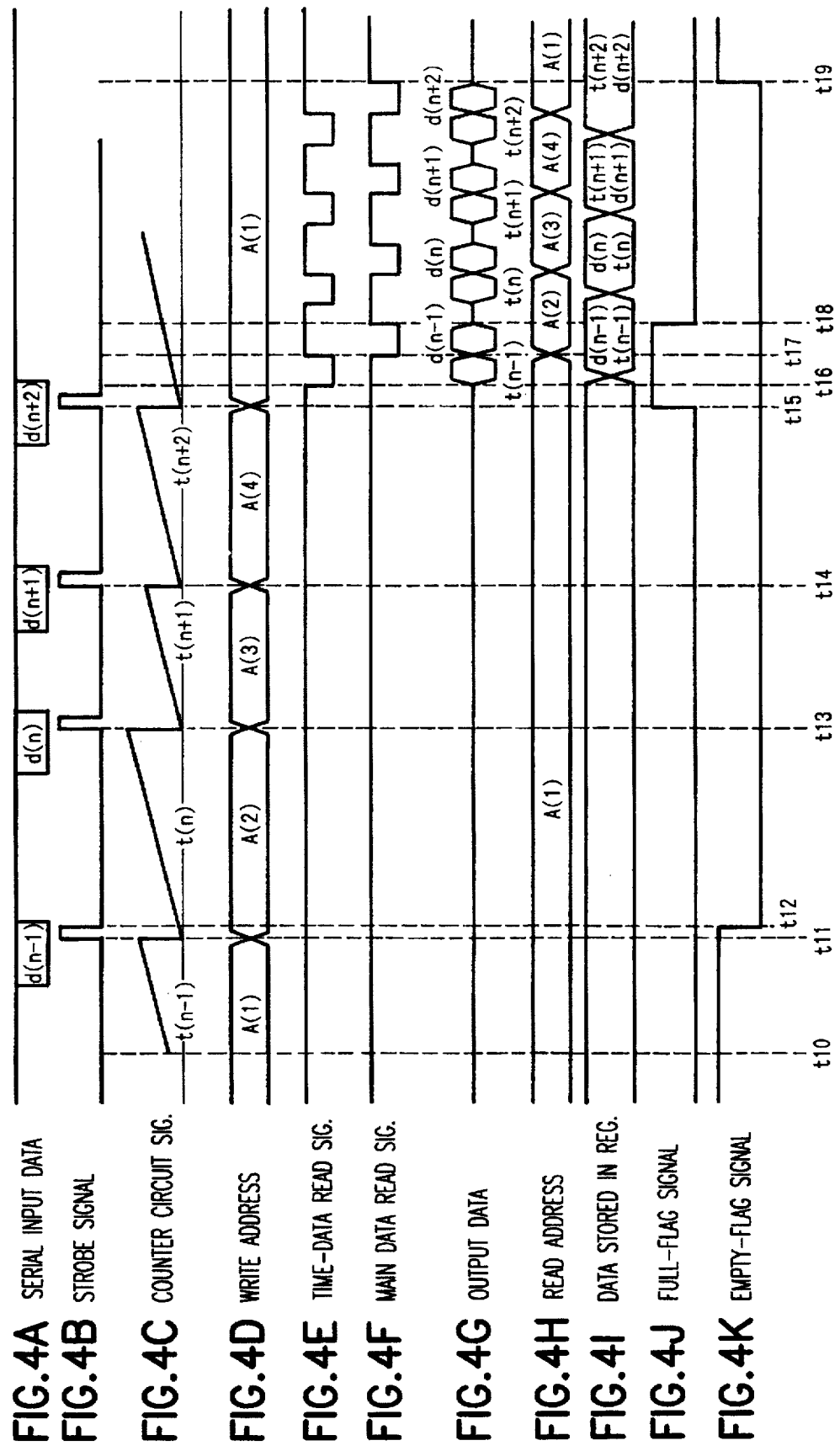
FIGS. 4A to 4K are time charts showing data and signals representing operations of the data receiving device of FIG. 8.

Next, operations of the data receiving device of the second embodiment will be described with reference to time charts of FIGS. 4A to 4K. Like FIGS. 2A to 2I, the time charts contain a variety of forms wherein FIG. 4A shows input serial data which are transmitted to the receiving circuit 2 in an asynchronous manner, wherein the input serial data sequentially arrive the receiving circuit 2 in an order of d(n−1), d(n), d(n+1) and d(n+2). FIG. 4B shows a strobe signal which is outputted from the receiving circuit 2; FIG. 4C shows counting operations of the counter circuit 3; FIG. 4D shows addresses which are set by the write-address creating circuits 11a and 12a; FIG. 4E shows a time-data read signal which is provided by the host CPU; FIG. 4F shows a main-data read signal which is provided by the host CPU; FIG. 4G shows data which are outputted onto the output-data bus; FIG. 4H shows addresses which are set by the read-address creating circuits 11b and 12b; FIG. 4I shows data which are stored in the register circuits 4 and 5; FIG. 4J shows a full-flag signal which is outputted from the memory circuit 7; and FIG. 4K shows an empty-flag signal which is outputted from the memory circuit 7.

In the second embodiment, a pair of main data and time data are treated as data of one word; and the memory circuit 7 is configured such that maximum four words can be stored therein. In addition, the main-data storing circuit 11 and the time-data storing circuit 12 store main data and the time data respectively at addresses A(1), A(2), A(3) and A(4) thereof. Every time increment operation is carried out, the address, which is set by each of the write-address creating circuits 11a and 12a, is changed in an order of A(1), A(2), A(3), A(4), A(1), . . . .

Similar to the aforementioned first embodiment, the data receiving device of the second embodiment receives the main-data read signal and time-data read signal from the host CPU (not shown). At a moment t10, the memory circuit 7 does not store non-read data, so an empty-flag signal is 'ON'. Further, the same address A(1) is set by the write-address creating circuits 11a, 12a and the read-address creating circuits 11b, 12b. At a moment t11, the receiving circuit 2 receives the input serial data d(n−1), so it produces a strobe signal; in other words, it produces a first pulse of the strobe signal.

The strobe signal is supplied to the memory circuit 7; thereafter, the main-data storing circuit 11 and the time-data storing circuit 12 respectively write the main data d(n−1) and time data t(n−1) at their addresses A(1) which are set by the write-address creating circuits 11a and 12a. Immediately thereafter, the write-address creating circuits 11a and 12a are subjected to increment operation by the strobe signal. Thus, the address set by each of the write-address creating circuits 11a and 12a is changed to A(2). This indicates that the non-read data are written into the memory circuit 7; and consequently, the empty-flag signal is turned 'OFF' at a moment t12; in other words, the memory circuit 7 forms a trailing edge of an elongated pulse of the empty-flag signal.

At a moment t13 when the receiving circuit 2 receives the input serial data d(n), the above process is repeated with respect to the input serial data d(n). Thus, the main-data storing circuit 11 writes main data d(n) at the address A(2) thereof; and the time-data storing circuit 12 writes time data t(n) at the address A(2) thereof. Then, the write-address creating circuits 11a and 12a are subjected to increment operation, so their addresses are changed to A(3).

Thereafter, the above process is repeated with respect to other input serial data as well. As a result, at a moment t14, the main-data storing circuit 11 writes main data d(n+1) at the address A(3) thereof; and the time-data storing circuit 12 writes time data t(n+1) at the address A(3) thereof. At a moment t15, the main-data storing circuit 11 writes main data d(n+2) at the address A(4) thereof; and the time-data storing circuit 12 writes time data t(n+2) at the address A(4) thereof. Thus, four words of non-read data are completely stored in the memory circuit 7. In other words, storage capacity of the memory circuit 7 is fully occupied by four sets of main data and time data. Consequently, the memory circuit 7 turns a full-flag signal 'ON' at the moment t25; in other words, the memory circuit 7 forms a leading edge of a pulse of the full-flag signal.

Thereafter, the addresses set by the write-address creating circuits 11a and 12a are returned to A(1).

When detecting that the full-flag signal is turned 'ON', the host CPU produces a set of main-data read signal and time-data read signal in accordance with a certain procedure which will be described below.

Similar to the aforementioned first embodiment, the time-data read signal is outputted prior to the main-data read signal in the second embodiment. When detecting an ON event of the full-flag signal, the host CPU outputs a time-data read signal at a moment t16; in other words, the host CPU provides a leading edge of a reversed pulse of the time-data read signal. The time-data read signal is delivered to the register circuits 4 and 5. Thus, the first register circuit 4 accesses the main-data storing circuit 11 to extract the main data d(n−1) written at the address A(1) which is designated by the read-address creating circuit 11b; and the main data extracted are stored therein. In addition, the second register circuit 5 accesses the time-data storing circuit 12 to extract the time data t(n−1) written at the address A(1) which is designated by the read-address creating circuit 12b; and the time data extracted are stored therein. The time data t(n−1) are outputted onto the output-data bus in synchronization with the time-data read signal at the moment t16.

Thereafter, the host CPU outputs a main-data read signal at a moment t17; in other words, the host CPU provides a leading edge of a reversed pulse of the main-data read signal. When receiving the main-data read signal, the first register circuit 4 outputs the main data d(n−1) onto the output-data bus. The main-data read signal is delivered to the read-address creating circuits 11b and 12b as well.

At a moment t17, the host CPU produces a main-data read signal; in other words, the host CPU forms a leading edge of a reversed pulse of the main-data read signal. When receiving the main-data read signal, the first register circuit 4 outputs the main data d(n−1) onto the output-data bus. The main-data read signal is delivered to the read-address creating circuits 11b and 12b as well. The read-address creating circuits 11b and 12b are subjected to increment operation by the main-data read signal, so they designate the address A(2). Thus, three words of non-read data are stored in the memory circuit 7. Since an amount of the non-read data stored is reduced to three words, the memory circuit 7 turns the full-flag signal 'OFF' at a moment t18; in other words, the memory circuit 7 forms a trailing edge of the pulse of the full-flag signal.

Thereafter, the above process is repeated, so that the host CPU outputs a time-data read signal and a main-data read signal again. Consequently, the host CPU instructs the data receiving device 1 to output the time data t(n) and main data d(n) onto the output-data bus. Those processes are repeated with respect to other data as well. As a result, a set of the time data t(n+1) and main data d(n+1) and a set of the time data t(n+2) and main data d(n+2) are respectively outputted onto the output-data bus. After completion in reading out all the data, the memory circuit 7 is set in an empty state where the non-read data are not stored therein. After the empty state is established, the memory circuit 7 turns an empty-flag signal 'ON' at a moment t19; in other words, the memory circuit 7 forms a leading edge of an elongated pulse of the empty-flag signal. The host CPU acknowledges that the non-read data are not stored in the memory circuit 7 because the empty-flag signal is turned 'ON'. Thus, the memory circuit 7 completes reading process for the time data and main data. In short, the host CPU can read out four words of the time data and main data consecutively from the data receiving device.

As described above, the host CPU can acknowledge whether or not the non-read data exist on the basis of the empty-flag signal from the data receiving device of the second embodiment. In addition, the host CPU can acknowledge whether the memory circuit 7 is in a fully-stored state by the non-read data. Further, the host CPU is not required to perform reading process for the main data and time data every time the receiving circuit 2 receives the input serial data. In other words, after the data receiving device receives a plurality of input serial data, the host CPU performs reading process on all of the input serial data. Therefore, the data receiving device contributes to improvement in working efficiency of the host CPU. Moreover, the host CPU outputs the read signals to the data receiving device so that data, which should be read out next time, are temporarily stored in the register circuits 4 and 5. Herein, it is not necessary to synchronize receiving timings for the receiving circuit 2 with reading timings for the register circuits 4 and 5; therefore, the reading timings can be freely determined without restriction.

[C] Third Embodiment

Figure 5:
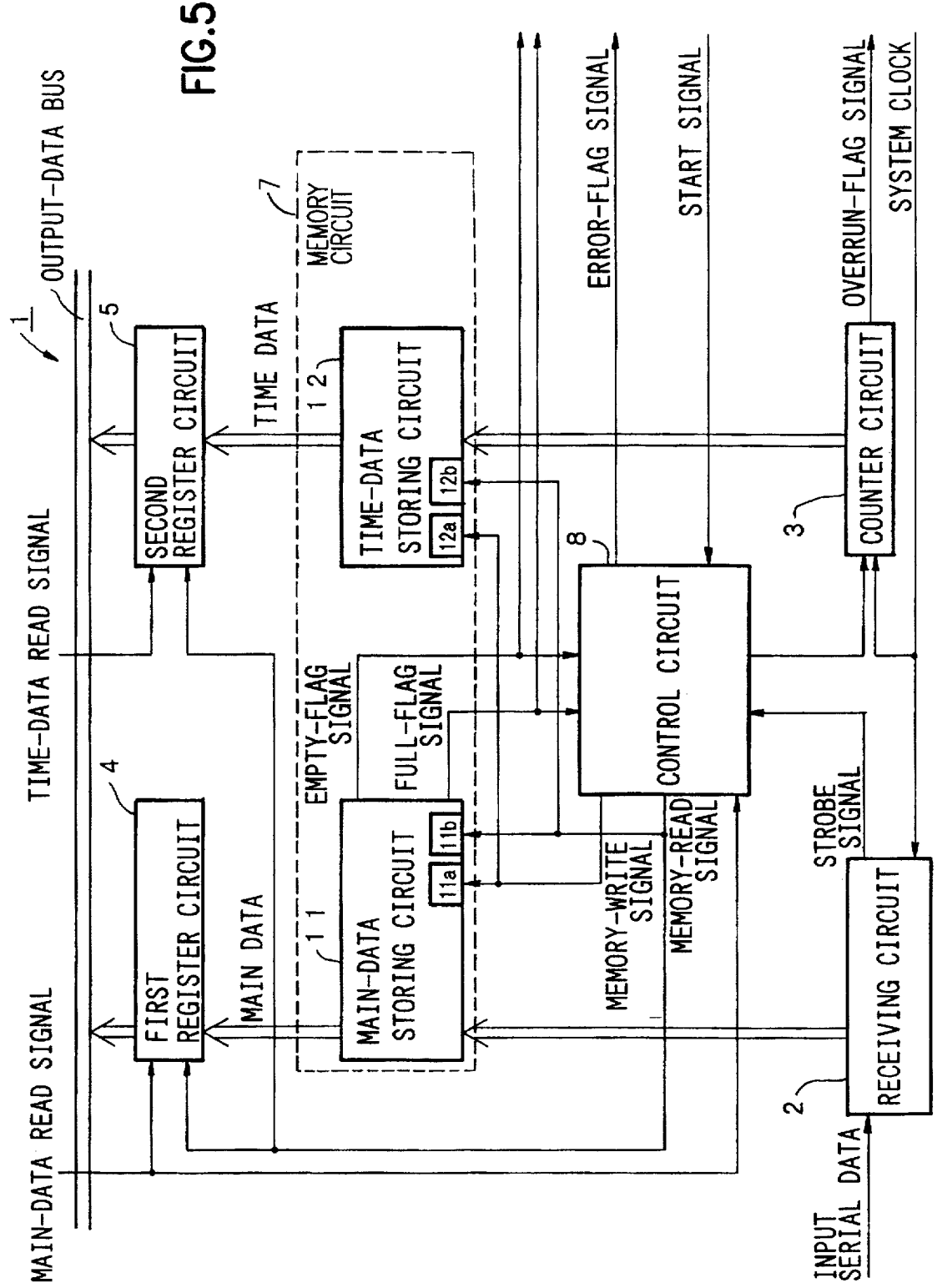
FIG. 5 is a block diagram showing a configuration of a data receiving device in accordance with a third embodiment of the invention.

FIG. 5 shows a configuration of a data receiving device which is designed in accordance with a third embodiment of the invention. As compared to the second embodiment, the third embodiment is designed to involve some practical improvement. Difference between the second embodiment and third embodiment is provision of a control circuit 8. In FIG. 5, parts equivalent to those of FIG. 3 are designated by the same numerals; hence, the description thereof will be omitted. The control circuit 8 is provided to control writing process of data for the memory circuit 7 as well as reading process of data for the register circuits 4 and 5. The control circuit 8 produces an error-flag signal when the receiving circuit 2 further receives input serial data under a fully-stored state where all of the addresses of the memory circuit 7 are occupied by non-read data. Upon receipt of a start instruction, the control circuit 8 performs initialization on the error-flag signal and data of the registers. Further, the control circuit 8 stores a control flag to switch over initial operation and continuous operation.

Figure 6:
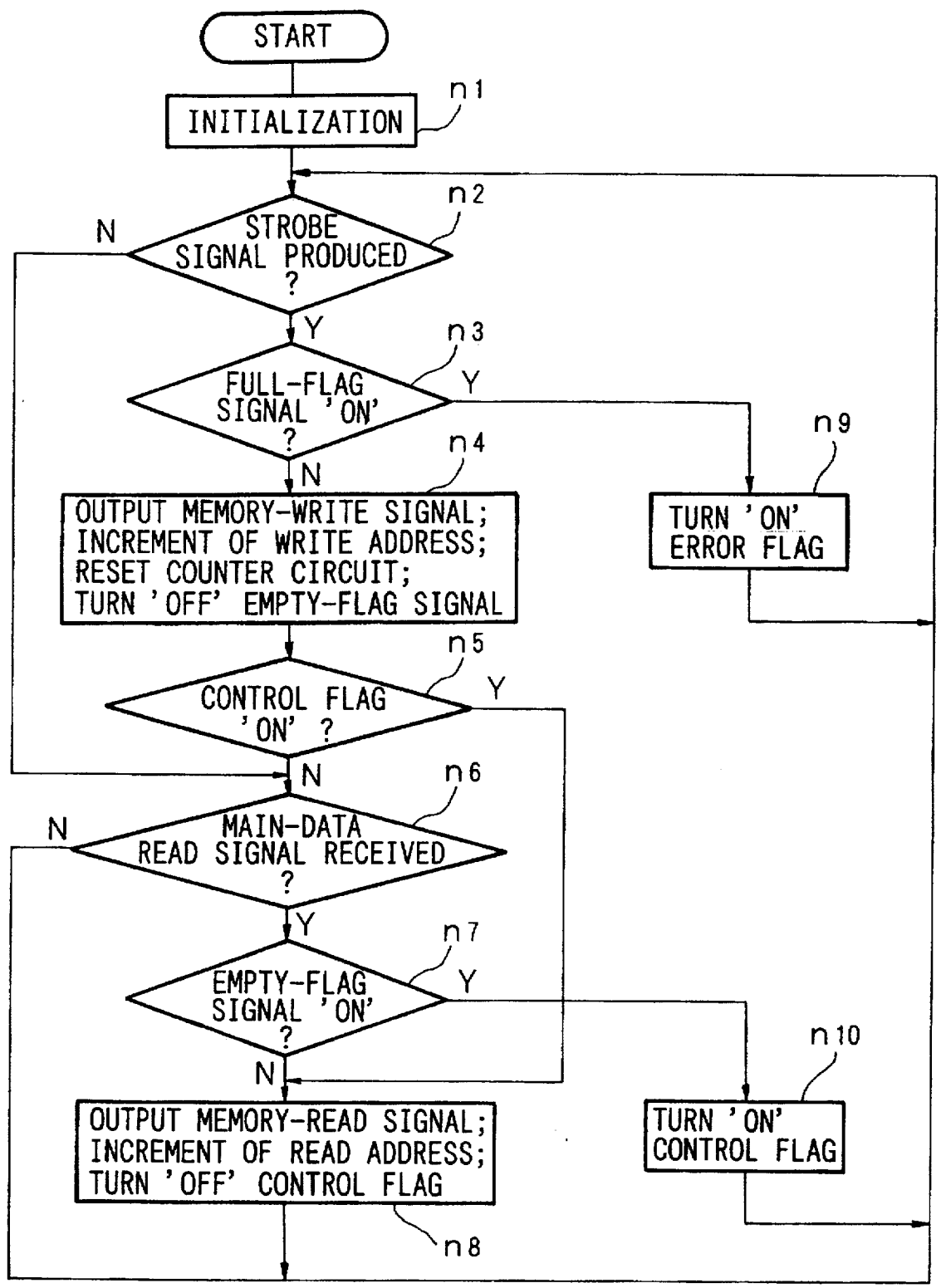
FIG. 6 is a flowchart showing processes which are executed by the data receiving device of FIG. 5.

Next, operations of the data receiving device of the third embodiment will be described with reference to FIG. 6 and FIGS. 7A to 7O. Herein, FIG. 6 is a flowchart showing operations of the control circuit 8; and FIGS. 7A to 7O provide time charts showing the operations of the data receiving device. FIG. 7A shows a start signal which the control circuit 8 receives; FIG. 7B shows input serial data which are transmitted to the receiving circuit 2 in an asynchronous manner; FIG. 7C shows a strobe signal which the receiving circuit 2 produces; FIG. 7D shows a memory-write signal which the control circuit 8 produces and by which the control circuit 8 instructs the memory circuit 7 to perform writing process of data; FIG. 7E shows addresses which the write-address creating circuits 11a and 12a designate; FIG. 7F shows a memory-read signal which the control circuit 8 produces and by which the control circuit 8 instructs the memory circuit 7 to perform reading process of data; FIG. 7G shows addresses which are designated by the read-address creating circuits 11b and 12b; FIG. 7H shows data which are stored in the register circuits 4 and 5; FIG. 7I shows a time-data read signal which is produced by the host CPU; FIG. 7J shows a main-data read signal which is produced by the host CPU; FIG. 7K shows data which are outputted onto the output-data bus; FIG. 7L shows an empty-flag signal which is produced by the memory circuit 7; FIG. 7M shows a full-flag signal which is produced by the memory circuit 7; FIG. 7N shows a control flag which is used to switch over initial operation and continuous operation; and FIG. 7O shows an error-flag signal which is produced by the control circuit 8.

Similar to the aforementioned second embodiment, the memory circuit 7 used by the third embodiment has a storage area which corresponds to four words of data. At a moment t21, a start signal is supplied to the control circuit 8, so step n1 in FIG. 6 is carried out to perform initialization. Thus, the empty-flag signal is 'ON'; the full-flag signal is 'OFF'; the control flag is 'ON'; and error-flag signal is 'OFF'. In addition, the same address A(1) is set by the write-address creating circuits 11a, 12a and the read-address creating circuits 11b, 12b. Further, counting operation of the counter circuit 3 is started. When the data receiving device 1 receives input serial data d0, the receiving circuit 2 produces a strobe signal at a moment t22; in other words, the receiving circuit 2 forms a leading edge of a pulse of the strobe signal. This strobe signal is supplied to the control circuit 8. So, the control circuit 8 proceeds to step n3 through step n2. At that moment, the full-flag signal is 'OFF'; therefore, the control circuit 8 further proceeds to step n4 through step n3. In the step n4, following process is carried out.

At first, the control circuit 8 supplies a memory-write signal to the write-address creating circuits 11a and 12a at the moment t22; in other words, the control circuit 8 forms a leading edge of a reversed pulse of the memory-write signal. Thanks to supplying of the memory-write signal, the main-data storing circuit 11 stores the main data d0 at the address A(1) which is designated by the write-address creating circuit 11a; and the time-data storing circuit 12 stores time data t0, representative of count number of the counter circuit 3, at the address A(1) which is designated by the write-address creating circuit 12a. Thereafter, the write-address creating circuits 11a and 12a are subjected to increment operation, so they designate the address A(2). The control circuit 8 supplies a reset signal to the counter circuit 3 to reset its counting operation. This indicates that the memory circuit 7 stores non-read data; and consequently, the empty-flag signal is turned 'OFF' at a moment t23; in other words, the memory circuit 7 forms a trailing edge of a pulse of the empty-flag signal.

At the above moment, the control flag is 'ON'; therefore, the control circuit 8 proceeds to step n8 through step n5. In the step n5, following process is carried out.

At a moment t24, the control circuit 8 produces a memory-read signal; in other words, the control circuit 8 forms a leading edge of a pulse of the memory-read signal. The memory-read signal is delivered to the register circuits 4 and 5. Thus, the first register circuit 4 extracts data of the address A(1) of the main-data storing circuit 11, so the data extracted are stored therein; and the second register circuit 5 extracts data of the address A(1) of the time-data storing circuit 12, so the data extracted are stored therein. In addition, the read-address creating circuits 11b and 12b are subjected to increment operation by the memory-read signal, so they designate the address A(2). Further, the control circuit 8 turns 'OFF' the control flag in response to the memory-read signal at the moment t24. This indicates that the memory circuit 7 is now in an empty state where the non-read data are not stored. Thus, the empty-flag signal is turned 'ON' again at a moment t25.

Thereafter, if the receiving circuit 2 receives input serial data d1 at a moment t26, the control circuit 8 proceeds to step n4 again wherein the aforementioned processes are carried out. After execution of the step n4, the control circuit 8 proceeds to step n6 through step n5 because the control flag is 'OFF' At this moment, however, the control circuit 8 proceeds back to step n2 again because the control circuit 8 does not receive the main-data read signal from the host CPU.

By repeating the above processes, input serial data d2 to d4 are sequentially received by the receiving circuit 2. After the memory circuit 7 finishes storing four words of time data and main data, the full-flag signal is turned 'ON' at a moment t27.

If the receiving circuit 2 further receives input serial data d5 at a moment t28, the control circuit 8 proceeds to step n3 through step n2. At this moment, the control circuit 8 further proceeds to step n9 because the full-flag signal is 'ON'. So, at a moment t29, the control circuit 8 turns 'ON' the error-flag signal. Thanks to a fact that the error-flag signal is turned 'ON', the host CPU can acknowledge that a receiving error occurs in the data receiving device. Thus, the host CPU can perform an error process by which receiving operation of the receiving circuit 2 is stopped.

When the full-flag signal is turned 'ON', the host CPU starts to perform an interrupt process. That is, the host CPU supplies a time-data read signal to the second register circuit 5 at a moment t30; in other words, the host CPU forms a leading edge of a reversed pulse of the time-data read signal. Thus, the time data t0, stored by the second register circuit 5, are outputted onto the output-data bus. Then, the host CPU outputs a main-data read signal at a moment t31; in other words, the host CPU forms a leading edge of a reversed pulse of the main-data read signal. Thus, the first register circuit 4 outputs the main data d0 onto the output-data bus. The main-data read signal is supplied to the control circuit 8 as well. As a result, the control circuit 8 proceeds to step n7 through step n6. The control circuit 8 further proceeds to step n8 through step n7 because the empty-flag signal is 'OFF'. So, the control circuit 8 produces a memory-read signal, which is delivered to the register circuits 4 and 5. Consequently, the first register circuit 4 extracts the main data d1 which are stored at the address A(2) designated by the read-address creating circuit 11b, so the main data d1 extracted are stored therein; and the second register circuit 5 extracts the time data t1 which are stored at the address A(2) designated by the read-address creating circuit 12b, so the time data t1 extracted are stored therein. Then, the read-address creating circuits 11b and 12b are subjected to increment operation by the memory-read signal, so they designate the address A(3). As a result, an amount of the non-read data stored in the memory circuit 7 is reduced to three words. Thus, the full-flag signal is turned 'OFF' at a moment t32.

By repeating the above processes, main data d2, d3 and time data t2, t3 are outputted onto the output-data bus. Then, if main data d4 and time data t4 are stored by the register circuits 4 and 5 respectively, the memory circuit 7 is in an empty state where non-read data are not stored therein. So, the empty-flag signal is turned 'ON' at a moment t33. At that moment, the non-read data do not exist in the memory circuit 7; however, the register circuits 4 and 5 store non-read data. So, reading operation for the non-read data stored in the register circuits 4 and 5 can be started when the receiving circuit 2 receives next data so that the full-flag signal is turned 'ON' again.

Of course, it is possible to read out the non-read data from the register circuits 4 and 5 before the receiving circuit 2 receives the next data.

Even in the above case, if the host CPU outputs a set of main-data read signal and time-data read signal to the data receiving device, the main data d4 and time data t4 are outputted, from the register circuits 4 and 5, onto the output-data bus. By the way, if the main-data read signal is supplied to the control circuit 8 which is in step n6, the control circuit 8 proceeds not to step n8 but to step n10 through step n7 because the empty-flag signal is 'ON'; therefore, the control flag is turned 'ON' in the step n10. In short, the control circuit 8 prohibits production of the memory-read signal; instead, the control circuit 8 turns 'ON' the control flag at a moment t34. In a state where the control flag is 'ON', the memory circuit 7 has some offset value for the address thereof; however, each flag signal is set equal to its initial value. Therefore, the control circuit 8 produces the memory-read signal in response to a strobe signal which is produced when the receiving circuit 2 receives input serial data d6.

As described heretofore, if the data receiving device receives data under a state where the memory circuit 7 does not have any space for storing the data, a receiving error occurs so that the error-flag signal is turned 'ON'. Therefore, the host CPU can acknowledge whether the receiving error occurs in the data receiving device on the basis of the error-flag signal; and consequently, the host CPU can attend to the error process by which receiving operation of the receiving circuit 2 is stopped.

Similar to the second embodiment, the third embodiment is designed in such a way that data, which should be read out next, are stored by the register circuits 4 and 5 in response to the read signals outputted from the host CPU. So, it is not necessary to synchronize receiving timings for the receiving circuit 2 with reading timings for the register circuits 4 and 5; therefore, the reading timings can be freely determined without restriction. As a result, main data and time data can be smoothly read out with accuracy. Further, both of the main-data storing circuit 11 and the time-data storing circuit 12 are controlled by one control circuit 8; therefore, the data receiving device can be designed in a simple circuit configuration.

Incidentally, the data receiving device of the invention can be applied to a system (e.g., a sequencer) which receives MIDI data and records them as performance data. In that case, the aforementioned input serial data (or main data) are recorded as event data while the time data are recorded as duration data.

According to the invention, the data receiving device is designed to store receiving data in connection with receiving intervals of time as management data. So, when employing the data receiving device for the system which requires management for the receiving intervals of time, the host CPU, equipped in the system, can obtain the receiving data and receiving intervals of time from the data receiving device. Therefore, the host CPU is not required to measure the receiving intervals of time. In short, an amount of load imparted to the host CPU can be reduced.

In addition, when the count number of the counter circuit exceeds the maximum value which corresponds to a limit in counting, the counter circuit produces an overrun-flag signal. Therefore, by merely detecting number of times by which the overrun-flag signal occurs, the system can acknowledge number of times by which an overrun event occurs until data are received by the receiving circuit. Therefore, even if an overrun event occurs in the counter circuit, the system can obtain the receiving intervals of time with accuracy.

Further, the aforementioned receiving-flag circuit produces a receiving-flag signal when receiving a strobe signal, representative of completion of receipt, from the receiving circuit. So, the host CPU is not required to monitor whether the data receiving device receives data. Therefore, an amount of load imparted to the host CPU can be further reduced.

Furthermore, if a plurality of management data, which are not outputted, fully occupy storage capacity, the data receiving device produces a full-flag signal. In contrast, if the management data are not stored at all, the data receiving device produces an empty-flag signal. Therefore, it is possible to inform the host CPU of a fully-stored state or an empty state.

Moreover, if the data receiving device further receives data which cannot be stored therein because the storage capacity is fully occupied, the data receiving device produces an error-flag signal. Therefore, the system can detect whether a receiving error occurs in the data receiving device on the basis of the error-flag signal.

As this invention may be embodied in several forms without departing from the spirit of essential characteristics thereof, the present embodiments are therefore Illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. A data receiving device employed by a system which receives data sequentially transmitted thereto in a non-periodical manner and which manages receiving intervals of time between receiving moments of the data, the data receiving device comprising:

a receiving circuit which produces a receipt-completion signal when completing receipt of data transmitted thereto;

a counter circuit which performs counting operation in synchronization with time, wherein a count number of the counter circuit is reset upon receipt of the receipt-completion signal;

storing means for, when receiving the receipt-completion signal, storing the data, received by the receiving circuit, in connection with the count number, which is extracted from the counter circuit when being reset, as management data; and output means for when receiving an output instruction from the system, outputting the management data.

2. A data receiving device according to claim 1 wherein the counter circuit produces an overrun-flag signal when the count number exceeds a maximum value, corresponding to a limit in counting, so that the count number is reset to zero.

3. A data receiving device according to claim 1 or 2 further comprising a receiving-flag circuit which when receiving the receipt-completion signal, produces a receiving-flag signal representative of existence of the data received by the receiving circuit.

4. A data receiving device according to claim 1 wherein the storing means has storage capacity for storing a plurality of management data, and the data receiving device further comprising:

first means for producing a full-flag signal representative of a fully-stored state of the storing means in which the storage capacity is fully occupied by the management data before being outputted by the output means; and second means for producing an empty-flag signal representative of an empty state of the storing means which does not store the management data before being outputted by the output means at all.

5. A data receiving device according to claim 4 further comprising third means for when the receiving circuit receives data under the fully-stored state, producing an error-flag signal.

6. A data receiving device employed by a system which receives data sequentially transmitted thereto in a non-periodical manner under control of a host CPU, the data receiving device comprising:

a receiving circuit for sequentially receiving a plurality of input data which are sequentially transmitted thereto in a non-periodical manner, the receiving circuit producing a strobe signal when receiving each input data;

a counter circuit for measuring a receiving interval of time between moments of receiving two input data which are consecutively received by the receiving circuit, so that the receiving interval of time is provided as time data;

a memory circuit for storing main data, which are extracted from the receiving circuit, together with the time data, wherein the main data are stored therein with being related to the time data;

a control circuit for controlling read/write states of the memory circuit such that the read state is started after the write state if storage capacity of the memory circuit is fully occupied by predetermined sets of main data and time data;

a first register circuit for temporarily storing the main data, which are extracted from the memory circuit, under control of the control circuit, the main data being outputted from the first register circuit in accordance with a main-data read signal given from the host CPU; and a second register circuit for temporarily storing the time data, which are extracted from the memory circuit, under control of the control circuit, the time data being outputted from the second register circuit in accordance with a time-data read signal given from the host CPU.

7. A data receiving device according to claim 6 wherein the control circuit produces an error-flag signal when detecting a receiving error in which the receiving circuit further receives the input data under a fully-stored state where the storage capacity of the memory circuit is fully occupied by the main data and time data, so that the host CPU acknowledging occurrence of the receiving error by the error-flag signal.

8. A data receiving device according to claim 6 wherein the counter circuit produces an overrun-flag signal when detecting an overrun event in which the count number thereof overruns a maximum value, corresponding to a limit in counting, so that the host CPU acknowledging occurrence of the overrun event.

* * * * *